Dec. 24, 1929.     M. P. VALINE     1,741,085
TRAILER HITCH AND TIRE CARRIER
Filed Jan. 21, 1928
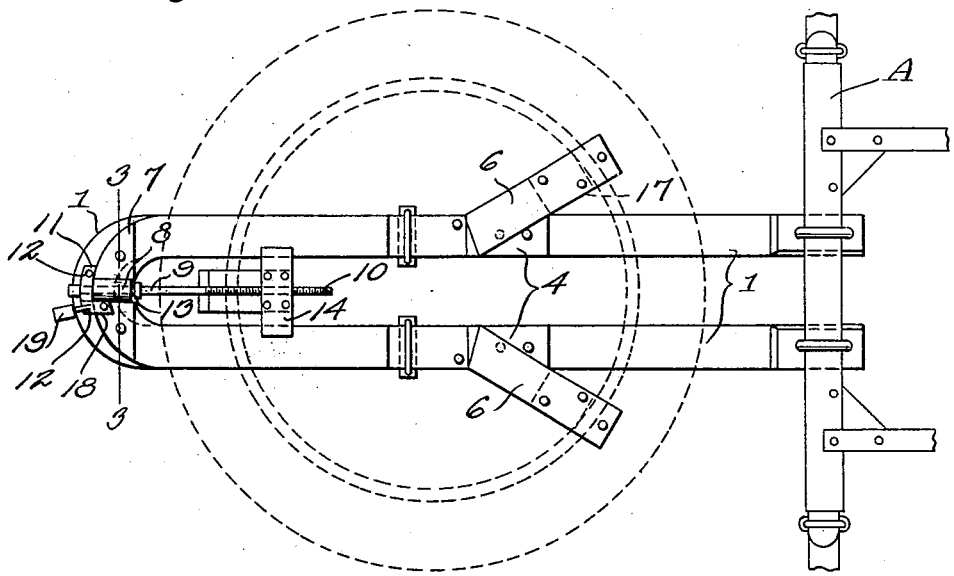
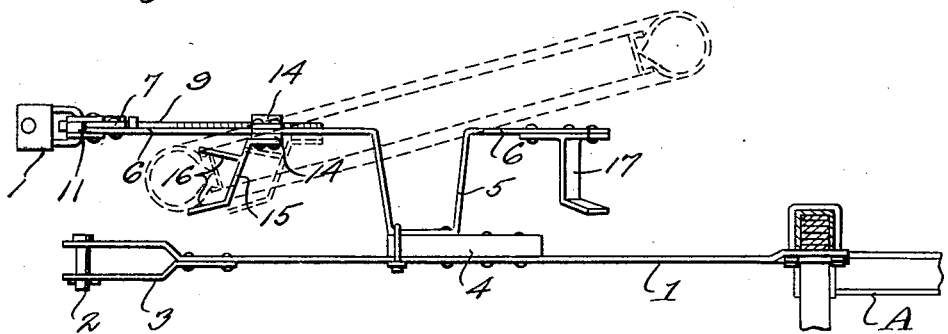
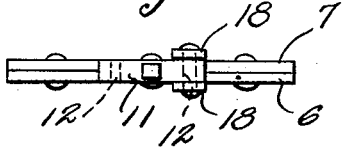
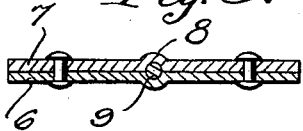
M. P. Valine
INVENTOR
BY Victor J. Evans
ATTORNEY
WITNESS:

Patented Dec. 24, 1929

1,741,085

UNITED STATES PATENT OFFICE

MANUEL P. VALINE, OF HAMILTON CITY, CALIFORNIA

TRAILER HITCH AND TIRE CARRIER

Application filed January 21, 1928. Serial No. 248,532.

This invention relates to vehicles, and its general object is to provide a combined trailer hitch and tire carrier, that not only provides means whereby a trailer can be easily and conveniently secured to and propelled by a vehicle, but includes means supported and secured to the hitch for adjustably receiving a spare tire and its rim, with the result the space between the vehicle can be used to an advantage, namely, for receiving a tire carrier.

A further object of the invention is to provide a tire carrier, that is adjustable for receiving various sizes of tires, and their rims, and also whereby a tire and its rim can be easily mounted thereon and secured in fixed relation thereto.

Another object of the invention is to provide a device of the character set forth, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the device forming the subject matter of the present invention and showing the same secured to a vehicle with a tire and its rim in dotted lines fixed in the tire carrier portion thereof.

Figure 2 is a side elevation of the device and showing the position assumed by the tire when being removed therefrom.

Figure 3 is a sectional view taken approximately on line 3—3 of Figure 1.

Figure 4 is a rear end view.

Referring to the drawings in detail, the letter A indicates the rear end of a vehicle and while I have shown my device secured to a vehicle of a well known make, I want it understood that it can be adapted for all types of motor vehicles without departing from the spirit of the invention.

The device includes a substantially elongated U-shaped member 1 having its spaced ends formed in a manner to be secured to the rear end of a vehicle, while the bight portion thereof is bent upwardly upon itself and provided with an opening for receiving a clevis pin 2 which also passes through a substantially U-shaped strip 3 having its spaced ends bent and secured to the arms of the member in a manner to space the strip from the bight portion as best shown in Figure 2 of the drawings.

Secured to each of the arms of the member 1 intermediate the ends thereof are blocks 4 which have fixed thereto the U-shaped portions 5 of the tire carrier member 6. The tire carrier member has its rear end connected by a rounded portion which has formed therein centrally of the ends thereof a semi-circular in cross section recess and secured to the curved portion is a plate 7 which is also provided with a similar shaped recess disposed for cooperation with the recess first mentioned to provide a bearing 8 which receives the shank 9 of a screw 10.

Secured to the shank 9 of the screw 10 is a handle 11 which is provided with openings 12 upon opposite sides thereof. The shank 9 has secured thereon a collar 13 disposed inwardly of rounded portion to limit the movement of the screw in one direction, as will be apparent, and bridging the arms of the U-shaped member 6 and secured in a manner to have the ends thereof arranged in spaced relation with respect to each other to provide guides receiving the arms of the U-shaped member for slidable movement thereon are plates 14 formed with a threaded bore between the same for receiving the screw 10.

The lower plate 14 has secured thereto and depending therefrom at an inclination, an arm 15, having formed therewith and disposed in spaced relation with respect to each other oppositely inclined tongues 16 for the purpose of receiving a mounted tire as suggested in dotted lines in Figure 1 of the drawings. The front ends of the tire carrier member 6 are inclined outwardly and fixed to these ends are rim receiving brackets 17.

Pivotally secured to the plate 7 and the bottom of the rounded portion respectively, are ears 18 having an opening formed in their free end adapted to register with one of the openings of the handle 11, and when the openings are in registration, they are adapted to receive the shackle of a lock indicated by the reference numeral 19.

From the above description and disclosure of the drawings, it will be obvious that I have provided a combined trailer hitch and tire carrier that can be associated with various makes of vehicles and trailers, for propelling the latter and due to the fact that the hitch supports means for carrying a tire, the space between the trailer and the hitch which is generally wasted will now be put to a useful purpose by my device. When it is desired to secure a tire and its rim to the tire carrier, it will be apparent that the handle 11 will be rotated for imparting such movement to the screw which will slide the arm 15 until the desired adjustment is obtained, then the tire is arranged between the tongues 16 and upon the brackets 17, and the handle is again rotated for moving the arm and its tongues in clamping engagement with the rim of the tire for securing the same in fixed position as shown in Figure 1 of the drawings. The handle may then be locked through the medium of the lock as above set forth.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device for the purpose set forth, comprising a substantially U-shaped member designed to be hitched to the rear of the vehicle, a second substantially U-shaped member having a depending portion which is fixed to the first mentioned member, guide plates between the arms of the last U-shaped member, a screw swiveled in the outer end of the said member and threaded through the plates, means for locking the screw from turning, a tire engaging bracket carried by the lower plate, the arms of the said member having angle extensions and brackets on the lower faces thereof.

2. In a device for the purpose set forth, a supporting member designed to be fixed on the rear of a vehicle, a tire carrier which is U-shaped in plan and which has its arms provided with U-shaped portions that are bolted to the arms of the supporting member, slidable plates guided between the arms of the tire carrier member, a screw member having a non-threaded end swivelly supported at the rear of the tire carrying member and said plates having a threaded bore to receive the threaded end of the screw, swingable means for engaging the non-threaded end of the screw for holding the same from turning, a tire engaging bracket depending from the lower plate, said tire carrying member having its inner ends disposed at opposite angles and provided respectively with depending tire engaging brackets.

In testimony whereof I affix my signature.

MANUEL P. VALINE.